(12) United States Patent
Kim et al.

(10) Patent No.: US 6,992,745 B2
(45) Date of Patent: Jan. 31, 2006

(54) SIGNAL TRANSMISSION FILM, CONTROL SIGNAL PART AND LIQUID CRYSTAL DISPLAY INCLUDING THE FILM

(75) Inventors: Dong-Gyu Kim, Suwon (KR); Sin-Ku Kang, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 516 days.

(21) Appl. No.: 09/948,639

(22) Filed: Sep. 10, 2001

(65) Prior Publication Data

US 2002/0030658 A1   Mar. 14, 2002

(30) Foreign Application Priority Data

Sep. 8, 2000   (KR) ............................... 2000-53604

(51) Int. Cl.
*G02F 1/1345* (2006.01)
(52) U.S. Cl. .................. 349/152; 349/149; 345/87
(58) Field of Classification Search ............ 349/139, 349/143, 149–152; 257/690, 691, 692, 693; 345/87, 92
See application file for complete search history.

(56) References Cited

U.S. PATENT DOCUMENTS

| | | | |
|---|---|---|---|
| 3,966,302 A * | 6/1976 | Mikoda et al. ............ | 349/138 |
| 5,619,358 A | 4/1997 | Tanaka et al. ............ | 349/143 |
| 6,169,530 B1 * | 1/2001 | Mori et al. ............... | 345/93 |
| 6,281,959 B1 * | 8/2001 | Kim et al. ................ | 349/152 |
| 6,317,120 B1 * | 11/2001 | Eu .......................... | 345/211 |
| 6,366,331 B1 * | 4/2002 | Sakamoto et al. ......... | 349/43 |
| 6,459,466 B1 * | 10/2002 | Fujikawa ................. | 349/149 |
| 6,590,551 B1 * | 7/2003 | Kim ........................ | 345/92 |
| 6,741,297 B2 * | 5/2004 | Moon et al. .............. | 349/37 |

FOREIGN PATENT DOCUMENTS

JP    11-212100    8/1999

* cited by examiner

*Primary Examiner*—Dung T. Nguyen
*Assistant Examiner*—Thoi V. Duong
(74) *Attorney, Agent, or Firm*—McGuireWoods LLP

(57) ABSTRACT

The present invention provides a signal transmission film, a control signal part and a liquid crystal display including the signal transmission film that prevents the damage of wires due to electrolysis. In the present invention, a lead of several to several tens microns are formed on the signal transmission film by printing and patterning a copper wire on a high molecular film. The signal transmission film comprises a first signal lead transmitting a first signal voltage; a second signal lead transmitting a second signal voltage lower than the first signal voltage; and a lead formed between the first signal lead and the second signal lead. The lead could be several to several tens microns thick, the same voltage as the first signal voltage could be applied to the lead and the lead could be a dummy lead.

10 Claims, 13 Drawing Sheets

SIGNAL TRANSMISSION FILM, CONTROL SIGNAL PART AND LIQUID CRYSTAL DISPLAY INCLUDING THE FILM

BACKGROUND OF THE INVENTION (a) Field of the Invention

The present invention relates to signal transmission film, a control signal part and a liquid crystal display including the signal transmission film.

(b) Description of the Related Art

A liquid crystal display is one of the flat display devices widely used at the present time. The liquid crystal display comprises two substrates on which a plurality of electrodes are formed, a liquid crystal layer sandwiched between the two substrates and two polarizing films for polarizing the light attached to each outward surface of the substrates. The liquid crystal display controls the light transmittance, thereby to display picture images by applying different voltages to the electrodes while forming electric fields for varying the orientation of the liquid crystal molecules of the liquid crystal layer. In such a liquid crystal display, thin film transistors are formed in one of the two substrates, which is called as a TFT substrate, and switch the voltages applied to the electrodes.

A display region for displaying picture images is situated in the center of the TFT substrate. A plurality of signal lines, or a plurality of gate lines and data lines are formed in the directions of row and column, respectively. The gate lines and the data lines cross each other, thereby to define a plurality of pixel element regions. Each pixel element has a pixel electrode to which the data signal is applied via the data line. The thin film transistor sends the data signal transmitted via the data line to the pixel electrode by the gate signal transmitted via the gate line.

A plurality of gate pads connected to the gate lines and a plurality of data pads connected to the data lines are formed outside of the display region. These pads are connected to the external driving integrated circuits thereby to receive gate signals and data signals from the external driving integrated circuits and send them to the gate lines and the data lines.

A printed circuit board for gate signal transmission and a printed circuit board for data signal transmission are attached to the thin film transistor substrate using an anisotropic conducting film through an heat and compression process thereby to send the gate and the data signals to the thin film transistor. The thin film transistor and the printed circuit board for data signal transmission are connected by a data signal transmission film on which the data driving integrated circuit is mounted. The data driving integrated circuit converts an electric signal into a data signal and sends the data signal to the data line. And also, the thin film transistor and the printed circuit board for gate signal transmission are connected by a gate signal transmission film on which the gate driving integrated circuit is mounted. The gate driving integrated circuit converts an electric signal into a gate signal and sends the gate signal to the gate line.

Herein, gate control signals for controlling the gate signal could be outputted from the printed circuit board for data signal transmission not from the printed circuit board for gate signal transmission. And, these gate control signals could be transmitted to the gate signal transmission film.

The gate control signals are various kinds of control signals such as a gate-on-voltage, a gate-off-voltage and a common voltage for reference voltage to the difference of the data voltage in the thin film transistor.

These gate control signals inputted into the gate driving integrated circuit, while driving the liquid crystal display, have various kinds of magnitudes of voltage and are transmitted through gate control signal connection wires. The gate control signal connection wires are arranged abreast and closely on the thin film transistor substrate. Accordingly, a high voltage signal wire transmitting a high voltage such as the gate-on-voltage and a low voltage signal wire transmitting a low voltage such as the gate-off-voltage are arranged abreast and closely.

In this arrangement of the wires, a potential difference is formed between the high voltage signal wire and the low voltage signal wire while driving the liquid crystal display. However, this potential difference causes an electrolysis reaction with moistures permeated into the wires during manufacturing and operating the liquid crystal display, by a rule of the galvanic cell, thereby to damage the high voltage signal wire and results in inferior devices.

SUMMARY OF THE INVENTION

It is an object of the present invention to provide a signal transmission film, a control signal part and a liquid crystal display including the signal transmission film that prevents wires from damage due to electrolysis.

This object are provided, according to the present invention, by forming a thick lead located between a high voltage signal wire and a low voltage signal wire of the thin film transistor substrate in the control signal transmission film. In other words, the present invention provides the lead of several to several tens microns on the signal transmission film by printing and patterning a copper wire on a high molecular film. Herein, the lead is arranged on the control signal transmission film to be spatially located between the high voltage signal wire and the low voltage signal wire in the signal wires of several hundreds to several thousands.

According to one aspect of the present invention, a signal transmission film comprises a first signal lead transmitting a first signal voltage; a second signal lead transmitting a second signal voltage smaller than the first signal voltage; and a lead formed between the first signal lead and the second signal lead.

The lead could have a thickness of several to several tens microns, the same voltage as the first signal voltage could be applied to the lead and the lead could be a dummy lead.

According to another aspect of the present invention, a control signal part comprises a control signal wire part comprising a substrate, a first and a second signal wires on the substrate; a control signal transmission part comprising a film corresponding to the substrate, a first and a second signal leads on the film and a lead on the film, wherein the first and the second signal leads being connected to the first and the second signal wires and the lead being located spatially between the first and the second signal wires. The first signal lead transmits a first signal voltage and the second signal lead transmits a second signal voltage lower than the first signal voltage.

The lead could have a thickness of several to several tens microns. And, each of the signal lead could overlap at least one portion of the signal wire corresponding to itself.

The same voltage as the first signal voltage could be applied to the lead. The lead could overlap at least one portion of the wire.

A wire connected to the lead could be formed on the substrate. The wire could be connected to the first signal wire, or isolated from the first signal wire.

The wire could be formed by less oxidative conductive materials than the second signal wire. And, the wire could be formed by ITO or IZO.

The first signal lead could extend to the lead thereby to be in one body with the lead. And, the lead could be a dummy lead.

According to the other aspect of the present invention, a liquid crystal display comprises a display region on a substrate, wherein the display region comprising a gate line, a data line crossing the gate line thereby to define a pixel element region, a thin film transistor connected to the gate line and the data line in the pixel element region and a pixel electrode electrically connected to the thin film transistor; a control signal wire part on the substrate, wherein the control signal part comprising a first and a second signal wires; a control signal transmission part comprising a film corresponding to the substrate, a first and a second signal leads on the film and a lead on the film, wherein the first and the second signal leads being connected to the first and the second signal wires and the lead being located spatially between the first and the second signal wires.

The first signal lead transmits a first signal voltage and the second signal lead transmits a second signal voltage smaller than the first signal voltage.

The lead could have a thickness of several to several tens microns. Each of the signal lead could overlap at least one portion of the signal wire corresponding to itself. The same voltage as the first signal voltage could be applied to the lead.

The control signal transmission part could comprise a data driving integrated circuit or a gate driving integrated circuit.

The first signal voltage could be a gate-on-voltage or a power supplying voltage.

The second signal voltage could be a gate-off-voltage or a grounding voltage.

The lead is a dummy lead. And, a wire connected to the lead could be formed on the substrate.

The lead could overlap at least one portion of the wire.

The wire could be formed by conductive materials less oxidative than the second signal wire, ITO or IZO.

And also, the wire could be formed by conductive materials for forming the gate line, the data line or the pixel electrode.

The liquid crystal display could comprise a insulating layer covering the wire on the substrate, a contact hole exposing the portion of the wire in the insulating layer and an auxiliary pad connected to the wire through the contact hole, wherein the lead is connected to the wire to fully cover the contact hole in a length direction of the contact hole. Herein, the lead could cover at least one side of the contact hole in a width direction of the contact hole. And also, the lead could be located inside region of the contact hole thereby to expose both sides of the contact hole.

The liquid crystal display could comprise a gate signal transmission film connected to the substrate, wherein the wires are formed by connecting a first wire connected to the gate signal transmission film and a second wire connected to the control signal transmission part. Herein, the first and the second wires could be connected to each other by a manner in which the first wire is formed on the substrate, a first insulating layer covering the first wire and a first contact hole exposing an end of the first wire in the first insulating layer are further comprised, and the second wire is connected to the first wire through the first contact hole on the first insulating layer. And, further, a second insulating layer covering the second wire, a second contact hole exposing the pad of the second wire and a third contact hole exposing the pad of the first lower wire and auxiliary pads connected to the pads of the first and the second wires through the second and the third contact holes could be comprised.

In the liquid crystal display, the first signal wire could comprise a lower wire having a pad on the substrate, a first insulating layer covering the lower wire, an upper wire having a pad on the first insulating layer, a first contact hole exposing the lower wire in the first and the second insulating layers, a second contact hole exposing the upper wire in the second insulating layer and a auxiliary pad connected to both the pad of the lower wire and the pad of the upper wire.

BRIEF DESCRIPTION OF THE DRAWINGS

A more complete appreciation of the invention, and many of the advantages thereof, will be readily apparent as the same becomes better understood by reference to the following detailed description when considered in conjunction with the accompanying drawings in which like reference symbols indicate the same or the similar components, wherein.

DETAILED DESCRIPTION OF THE PREFERRED EMBODIMENTS

Preferred embodiments of the present invention will be explained with reference to the accompanying drawings.

Figure 1:
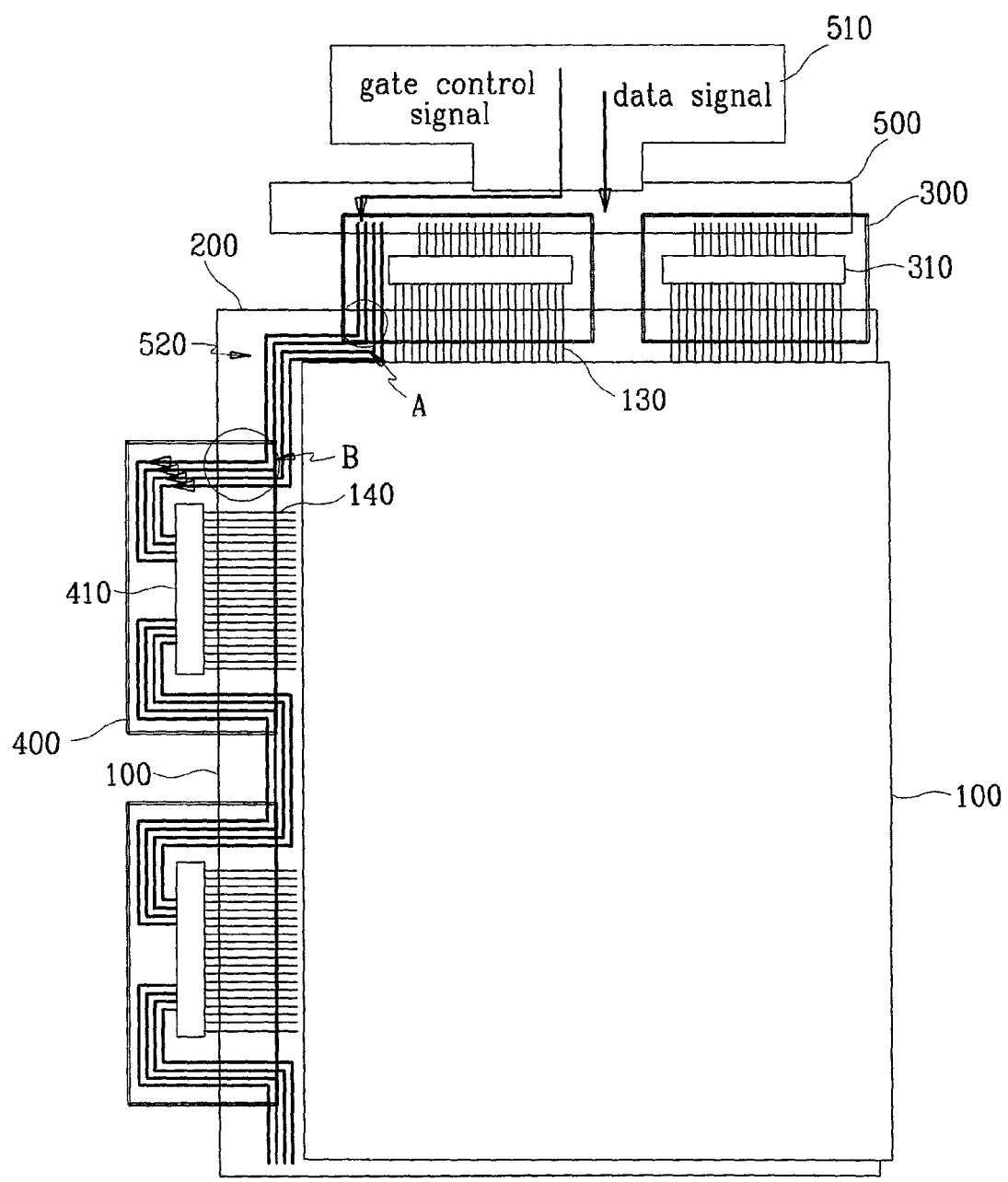
FIG. 1 is an outline view of a liquid crystal display including a control signal part.

FIG. 1 is an outline view of a liquid crystal display having a thin film transistor substrate on which gate control signal wires are formed.

A color filter substrate 100 is combined with a thin film transistor substrate 200. A data driving integrated circuit 310 for outputting data signals to data lines 130 and a gate driving integrated circuit 410 for outputting gate signals to gate lines 140 are situated outside of the thin film transistor substrate 200. The data driving integrated circuit 310 is mounted on a data signal transmission film 300 which is connected to a printed circuit board for data signal transmission 500 and the thin film transistor substrate 200 electrically. And, the gate driving integrated circuit 410 is mounted on a gate signal transmission film 400 which is connected to the thin film transistor substrate 200 electrically.

These gate and data transmission films 300 and 400 are electrically connected to the thin film transistor substrate 200 using an anisotropic conducting film (ACF) through a heat and compression process. Herein, leads formed in the films 300 and 400 are electrically connected to wires formed in the thin film transistor substrates 200 in a one to one correspondence through conductive materials (not shown) of the ACF.

Gate control signals for controlling the driving of the gate driving integrated circuit 410 are transmitted to the gate driving integrated circuit 410 via gate control interconnection wires 520. In gate control interconnection wires 520, wires of a printed circuit board for data signal transmission 500, control signal leads of the data signal transmission film 300, control signal wires of the thin film transistor substrate 200 and control signal leads of the gate signal transmission film 400 are connected to each other electrically. Arrows on the gate control interconnection wires 520 show the transmission direction of the gate control signals.

The gate control signals are gate-on-voltage (Von), gate-off-voltage (Voff), common voltage for reference voltage to the difference of the data voltage in the thin film transistor (Vcom), gate clock (CPV), start vertical signal (STV), line reverse signal (RVS), gate on enable (OE), grounding voltage (VGND), etc. These gate control signals control the driving of the gate driving circuit 410.

Of these gate control signals, each of the gate-on-voltage and the power supply voltage is 10V to 20V, while each of the gate-off-voltage and the grounding voltage is below 0V.

A high voltage signal wire for transmitting a high voltage such as the gate-on-voltage and a low voltage signal wire for transmitting a low voltage such as gate-off-voltage are arranged closely. In such a case, a potential difference is formed between the two wires when the liquid crystal display operates. The potential difference is equivalent to a voltage difference between the high voltage such as the gate-on-voltage and the low voltage such as the gate-off-voltage.

Moisture permeates into the wires during the manufacture and operation of the liquid crystal display. Especially, the moisture permeates into the wires at the location where the gate and the data transmission films 300 and 400 are attached to the thin film transistor 10, and concentrates on the step difference parts of the wires.

The moisture in itself has ions. Anions of them move the high voltage signal wire from the low voltage signal wire using the ACF as an electrolyte by the potential difference between the high voltage signal wire and the low voltage signal wire.

The high voltage signal wire reacts with the anions electrochemically, thereby to be melted in the electrolyte. Thus, the opening of the high voltage signal wire may result in due to an electrolysis.

Such an opening of the wires due to the electrolysis generates in the wires at the location where the gate and the data transmission films 300 and 400 are attached to the thin film transistor 10, especially, in the wires to be indicated as "A" and "B."

The present invention prevents the damage to the high voltage signal wire by preventing the anions from moving around the high voltage signal wire.

This will be explained with reference to the following drawings.

Figure 2:
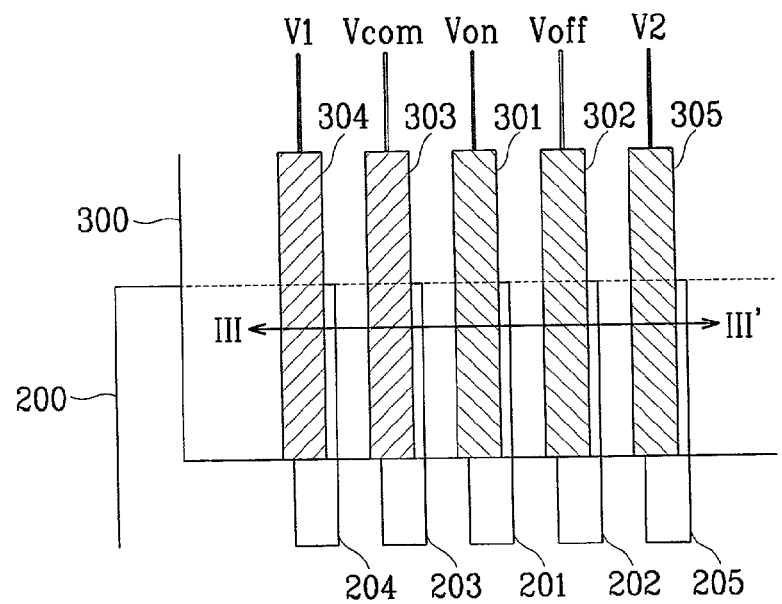
FIG. 2 is a plan view showing a wiring structure of a control signal part in which a high voltage redundancy wire is not formed.
Figure 3:
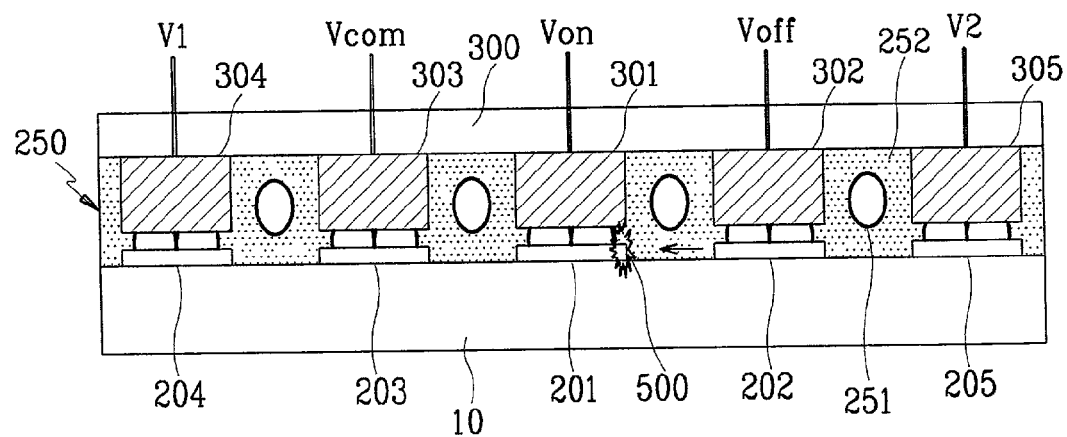
FIG. 3 is a cross-sectional view of the wiring structure of the control signal part taken along the line III–III' of FIG. 2.

FIG. 2 is a plan view showing a wiring structure of gate control signal leads of the data signal transmission film and gate control signal wires of the thin film transistor substrate in which a high voltage signal wire and a low voltage signal wire are arranged closely. FIG. 3 is a cross-sectional view of the wiring structure taken along the line III–III' of FIG. 2.

A thin film transistor substrate 200 with gate control signal wires 201, 202, 203, 204 and 205 is attached to a data signal transmission film 300 with gate control signal leads 301, 302, 303, 304 and 305 using an anisotropic conducting film (ACF) comprising conductive materials and an adhesive resin. Herein, leads of the film 300 are electrically connected to wires of the thin film transistor substrates 10 in a one to one correspondence through conductive materials (not shown) of the ACF.

In the data signal transmission film 300, a low voltage control lead 302 is located at one side of a high voltage signal lead 301 and a gate common voltage signal lead 303 is located at the other side of the high voltage signal lead 301. A high voltage of about 20V such as a gate-on-voltage is applied to the high voltage control lead 301, a (low voltage of below 0V such as a gate-off-voltage is applied to the low voltage control lead 302 and a gate common voltage of about 3V is applied to the gate common voltage lead 303.

The gate common voltage may be a low voltage compared with the gate-on-voltage. However, the gate-off-voltage lower than the gate common voltage will be taken as an example of the low voltage in the following description.

And, a high voltage signal wire 201, a low voltage signal wire 202, a gate common voltage signal wire 203 and other signal wires 204 and 205, which are connected to the leads 310, 302, 303, 304 and 305 in a one to one correspondence, are formed on the thin film transistor substrate 200.

To drive a liquid crystal display, the gate control signals are inputted to a gate driving integrated circuit (not shown) via control signal leads 301, 302, 303, 304 and 305 of the data signal transmission film 300, the signal wires 201, 202, 203, 304 and 205 of the thin film transistor substrate 200 and leads of a gate signal transmission film (not shown).

In this process, the gate-on-voltage is applied to the high voltage signal lead 301 and the high voltage signal wire 201 and the gate-off-voltage is applied to the low voltage signal lead 302 and the low voltage signal wire 202. Accordingly, a potential difference is formed between the high voltage signal lead 301/the high voltage signal wire 201 and the low voltage signal lead 302/the low voltage signal wire 202. The potential difference is equivalent to the voltage difference between the gate-on-voltage and the gate-off-voltage.

Moisture permeates into the wires while the liquid crystal display is manufactured or operated. Especially, the moisture permeates into the wires at the location where the gate and the data transmission films 300 and 400 are attached to the thin film transistor 10, and concentrates on the step difference parts of the wires.

The moisture in itself has ions. Anions 500 of them move to the high voltage signal wire 201 from the low voltage signal wire 202 using the ACF 250 as an electrolyte by the potential difference between the high voltage signal wire 201 and the low voltage signal wire 202. The high voltage signal wire 201 reacts with the anions 500 electrochemically, thereby melting in the electrolyte. As a result, the high voltage signal wire 201 opens due to an electrolysis.

However, when a control signal transmission film having a lead located spatially between the high voltage signal wire and the low voltage signal wire of the thin film transistor substrate is used, the lead functions as a wall that prevents the anions from moving into the high voltage signal wire. In such a case, although the moisture permeates into the control signal part where the control signal transmission film is attached to the thin film transistor substrate, the anions can not reach the high voltage signal wire, thereby not to melt the high voltage signal wire due to an electrolysis.

This will be explained through the following embodiments of the present invention.

Figure 4:
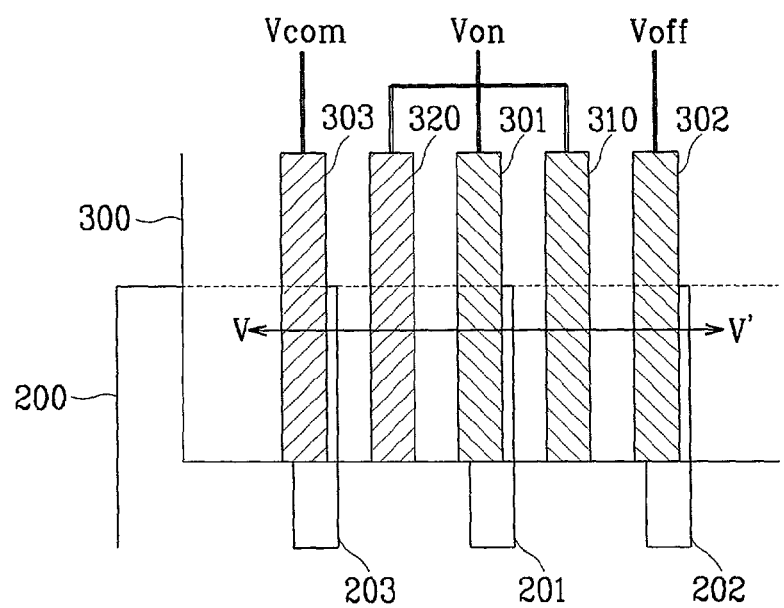
FIG. 4 is a plan view of a control signal part according to a first embodiment of the present invention.
Figure 5:
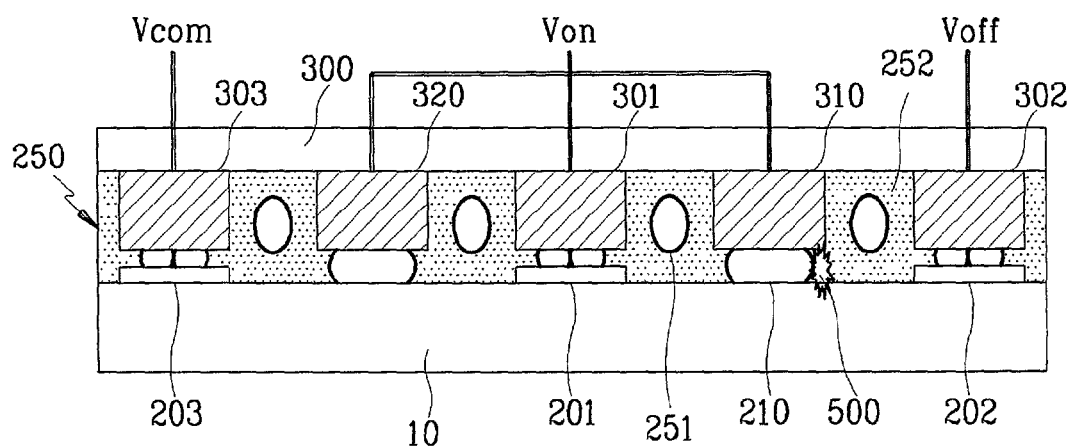
FIG. 5 is a cross-sectional view of the control signal part taken along the line V–V' of FIG. 4.

FIG. 4 is a plan view of a control signal part according to a first embodiment of the present invention and FIG. 5 is a cross-sectional view of the control signal part along the line V–V' of FIG. 4.

A data signal transmission film 300 with gate control signal leads 301, 302, 303 and high voltage redundancy leads 310 and 320 is attached to a thin film transistor substrate 200 with gate control signal wires 201, 202, 203 using an anisotropic conducting film 250 consisting of conductive materials 251 and an adhesive resin 252. Herein, the wires 201, 202, and 203 of the thin film transistor substrate 200 are electrically connected to the leads 301, 302 and 303 of the data signal transmission film 300 in a one to one correspondence through conductive materials 251 of the anisotropic conducting film 250.

In the data signal transmission film 300, a high voltage signal lead 301 transmitting a gate-on-voltage, a low voltage signal lead 302 transmitting a gate-off-voltage, a common voltage signal lead 303 transmitting the gate common voltage are formed. The high voltage dummy leads 310 and 320 transmitting the same voltage as the high voltage signal lead are formed at both sides of the high voltage signal lead 301.

And, a high voltage signal wire 201, a low voltage signal wire 202, a common voltage signal wire 203 are formed on the thin film substrate 10 to be connected to the high voltage signal lead 301, the low voltage signal lead 302 and the common voltage signal lead 303 in a one to one correspondence. The high voltage dummy leads 310 and 320 do not have corresponding wires on the thin film transistor 10.

The leads 301, 302, 303, 310 and 320 of the data signal transmission film 300 is formed thick by printing and patterning a copper wire of several to several tens microns on a high molecular film for the data signal transmission film. The leads 301, 302, 303, 310 and 320 of the data signal transmission film 300 is far thicker than the wires 201, 202 and 203 of the thin film transistor substrate 200. While the data signal transmission film 300 and the thin film transistor substrate 200 are attached to each other using the anisotropic conducting film 250 through an heat and compression process, the portion of the adhesive resin 252 where the high voltage dummy leads 310 and 320 exist is pushed by the thick leads 310 and 320, thereby to be compressed. Herein, the adhesive resin 252 becomes so dense that the moving of the anions 500 in the electrolyte could be checked. Accordingly, the high voltage dummy leads 310 and 320 function as walls that prevents the anions around it from moving.

To drive a liquid crystal display, the gate control signal is inputted to a gate driving integrated circuit (not shown) via the leads 301, 302 and 303 of the data signal transmission film 300, the signal wires 201, 202 and 203 of the thin film transistor substrate 200 and leads of a gate signal transmission film (not shown).

In this process, an equipotential is formed between the high voltage signal lead 301 (or, the high voltage signal wire 201) and the high voltage dummy leads 310 and 320. Because same voltages are applied to both the high voltage signal lead 301 (or, the high voltage signal lead) and the high voltage dummy leads 310 and 320. And also, because a low voltage such as the gate-off-voltage is applied to the low voltage signal lead 302 (or, the low voltage signal wire 202), a potential difference equivalent to a difference between the gate-on-voltage and the gate-off-voltage is formed between the low voltage signal wire 202 (or, the low voltage signal lead 302) and the high voltage dummy leads 310 and 320.

Moisture permeates into the wires at the location where the gate and the data transmission films 300 and 400 are attached to the thin film transistor 100 and concentrate on the step difference parts of the wires. The moisture in itself has ions. Anions 500 of them move to the high voltage dummy lead 310 from the low voltage signal wire 202 using the ACF as an electrolyte by the potential difference between the high voltage dummy lead 310 and the low voltage signal lead 202.

Herein, the high voltage dummy leads 310 and 320 may be melted in the electrolyte around the high voltage dummy lead 310 and 320 by an electrochemical reaction with the anions 500. However, the high voltage dummy leads 310 and 320 are so thick enough to provide sufficient cations to the anions. Thus, the corrosion becomes minimal.

The anions moved to the high voltage dummy leads 310 and 320 are blocked by the high voltage dummy leads 310 and 320, without further moving. In other words, the high voltage dummy leads 310 and 320 prevent the anions of the permeated moisture from moving to the high voltage signal wire 201 by staying between the high voltage signal wire 201 and the low voltage signal wire 202.

And, the anions permeated into the circumference of the high voltage signal wire 201 lost their moving direction and are floating around the high voltage signal wire 201 due to an equipotential between the high voltage signal lead 301 (or, the high voltage signal wire 201) and the high voltage dummy leads 310 and 320.

In the control signal part according to the first embodiment of the present invention, the high voltage dummy leads 310 and 320 are separated from the high voltage signal lead 301 on the data signal transmission film 300. However, the high voltage signal lead 301 could be in one body with the high voltage dummy leads 310 and 320 by making its area extend to the high voltage dummy leads 310 and 320. In such a case, the extended high voltage signal lead 301 is located spatially around the high voltage signal wire 201. Herein, although the anions move to the high voltage signal lead 301 and react with the high voltage signal lead 301, the high voltage signal leads 301 are so large and wide as to provide sufficient cations to the anions, causing little corrosion.

Figure 6:
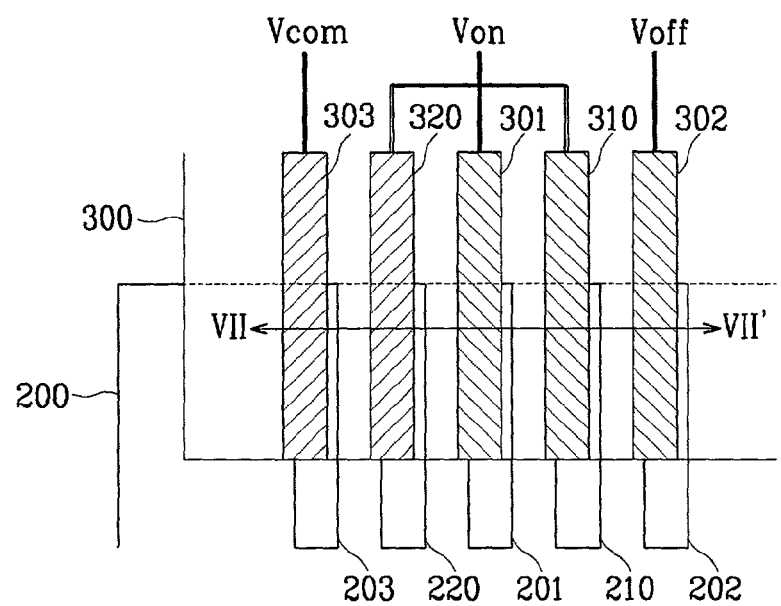
FIG. 6 is a plan view of a control signal part according to a second embodiment of the present invention.
Figure 7:
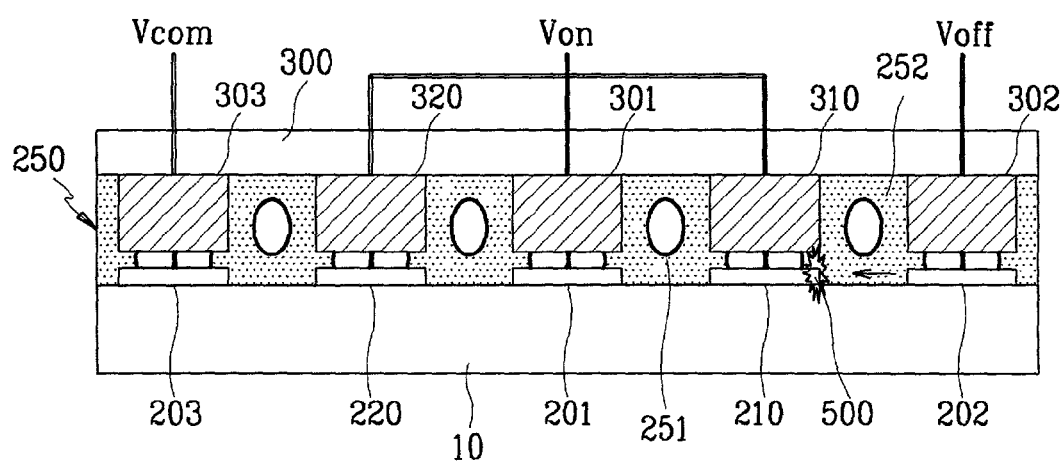
FIG. 7 is a cross-sectional view of the control signal part taken along the line VII–VII' of FIG. 6.

In the control signal part according to a second embodiment of the present invention as shown in FIG. 6 and FIG. 7, which is different from the first embodiment of the present invention, the high voltage dummy wires 210 and 220 corresponding to the high voltage dummy leads 310 and 320 of the data signal transmission film 300 could be formed on the thin film transistor substrate 200. This embodiment has an advantage of forming the wider equipotential region around the high voltage signal wire 201.

Herein, the high voltage dummy wires 210 and 220, as shown in FIG. 6, could be separated from the high voltage signal wire 201, or connected to the high voltage signal wire 201. When the high voltage dummy wires 210 and 220 are connected to the high voltage signal wire 201, the high voltage dummy leads 210 and 220 become redundancy wires for the high voltage signal wire 201.

The high voltage dummy wire on the thin film transistor substrate could be formed by using conventional conductive materials such as conductive materials for forming gate and data wires. Herein, the high voltage dummy wire could be formed by conductive materials less oxidative than the low voltage signal wire, such as one of copper family, one of silver family, one of chromium family, or one of molybdenum family comprising nitride chromium and nitride molybdenum. In such a case, the high voltage dummy wire could be less damaged due to the electrolysis. And, when the high voltage dummy wire is formed by oxidized conductive materials such as ITO or IZO, the high voltage dummy wire could be less reactive with the anions.

The high voltage dummy leads 310 and 320 of the data signal transmission film 300 are formed to prevent the electrolysis due to the potential difference between the high voltage signal wire 201 and the low voltage signal wire 202. Accordingly, it is possible to form only one high voltage dummy wire between the high voltage signal wire 201 and the low voltage signal wire 202 when the low voltage signal wire 202 is located at only one side of the high voltage signal wire 201.

In the above described first embodiment of the present invention, the wire transmitting the gate-on-voltage is taken as one example of the high voltage signal wire and the wire transmitting the gate-off-voltage is taken as one example of the low voltage signal wire. However, another example of the high voltage signal wire could be a wire transmitting a power supply voltage and another example of the low voltage signal wire could be a wire transmitting a grounding voltage.

In the control signal part according to the first and the second embodiments of the present invention, the control signal part formed on the data signal transmission film is taken as an example. However, the present invention is also applied to a case in which the control signal part is formed on the gate transmission film.

In the above described first and second embodiments of the present invention, only the gate control signal wire transmitting the gate control signal is described. However, the present invention is also applied to a case in which a data control signal wire transmitting the data control signal is formed on the thin film transistor substrate. And, the present invention could be applied to all cases proposed to prevent the melting of the wire due to the electrolysis caused by the potential difference between two wires.

The description of a liquid crystal display including the above cited control signal part is as follows.

Figure 8:
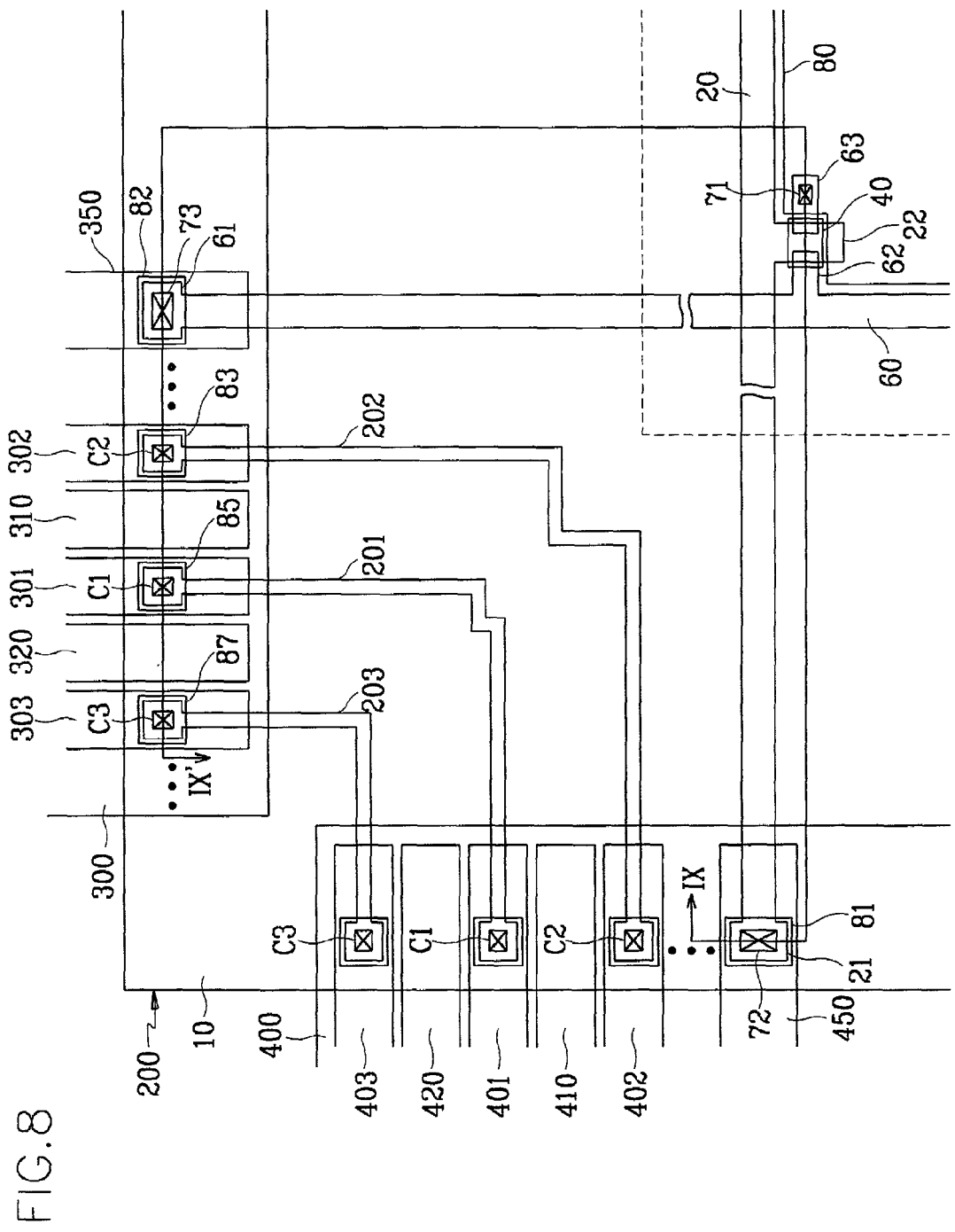
FIG. 8 is a plan view of a liquid crystal display according to a third embodiment of the present invention.
Figure 9:
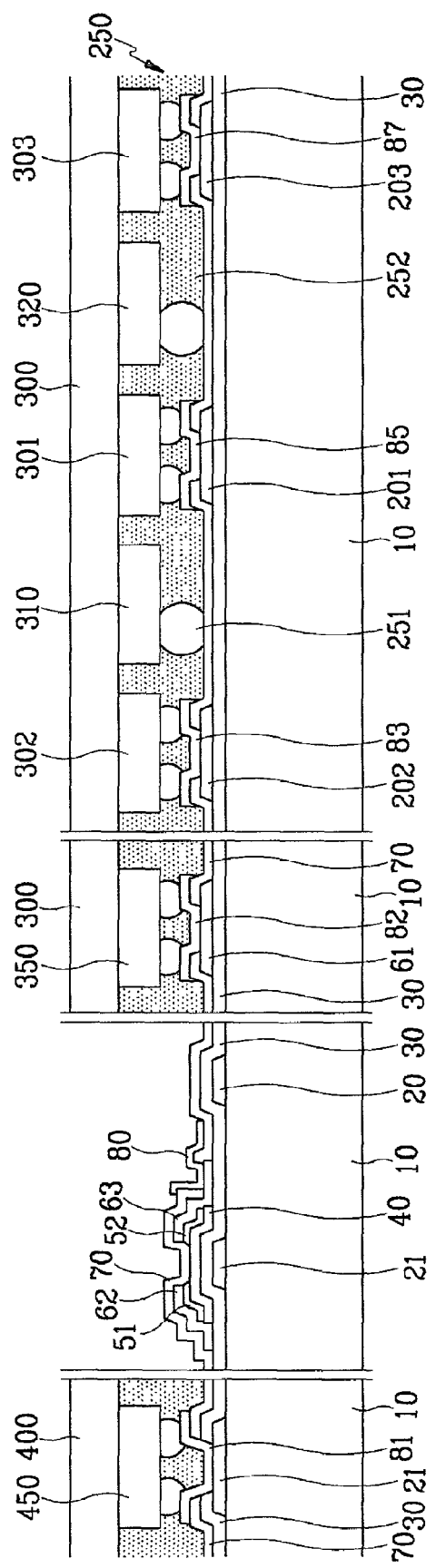
FIG. 9 is a cross-sectional view of the liquid crystal display taken along the line IX–IX' of FIG. 8.

FIG. 8 is a plan view of an liquid crystal display according to a third embodiment of the present invention and FIG. 9 is a cross-sectional view of the liquid crystal display along the line IX–IX' of FIG. 8.

In the liquid crystal display of the third embodiment of the present invention, control signal wires transmitting a gate control signal are formed by conductive materials for forming data wire and high voltage dummy wires corresponding to the high voltage dummy leads are not formed.

A gate wire 20, 21 and 22 comprising a gate line 20 including a gate electrode 22 and a gate pad 21 connected to the end of the gate line 20 is formed on an insulating substrate 10.

The gate line 20 extends in a horizontal direction and transmits the gate signal outputted from a gate driving integrated circuit (not shown) to pixel region. The gate wire 20, 21 and 22 could be formed by conventional conductive materials such as one of copper family, one of silver family, one of chromium family, or one of molybdenum family comprising nitride chromium and nitride molybdenum and could have a single layer structure or multi-layer structure.

And, a gate insulating layer 30 consisting of insulating materials such as silicon nitride, silicon oxide, etc. is formed to cover the gate wire 20, 21 and 22.

A semiconductor layer 40 consisting of amorphous silicon and corresponding to the gate electrode 22 is formed on the gate insulating layer 30.

And, a data wire 60, 61, 62 and 63 is formed on the gate insulating layer 40. The data wire comprises a data line 60 extending in a vertical direction and crossing the gate line 20 to define a pixel region, a data pad 61 connected to the end of the data line 60, a source electrode 62 protruding from the data line 60 and being connected to the semiconductor layer 40 electrically and a drain electrode 63 corresponding to the source electrode 61 and being connected to the semiconductor layer 40 electrically.

And, gate control signal wires 201, 202 and 203 are formed on the gate insulating layer 40. The gate control signal wires 201, 202 and 203 are a high voltage 20 signal wire 201 transmitting a high voltage such as a gate-on-voltage, a low voltage signal wire 202 transmitting a low voltage such as a gate-off-voltage and a common voltage signal wire 203 transmitting a common signal voltage.

Each of the gate control signal wire 201, 202 and 203 comprises a gate control signal line and gate control signal pads connected to both ends of the gate control signal line. The ends of the gate control signal wire 201, 202 and 203 could be connected to leads 301, 302 and 303 of a data signal transmission film 300 located at an upper portion of the thin film transistor substrate 200 and the other ends of them could be connected to leads 401, 402 and 403 of a gate signal transmission film 300 located at an left portion of the thin film transistor substrate 200.

Because of the above arrangement of the wires, the gate control signals transmitted via the leads 301, 302 and 303 of the data signal transmission film 300 is sent to a gate driving integrated circuit (not shown) via the gate control signal wires 201, 202 and 203 of the thin film transistor substrate 200 and the leads 401, 402 and 403 of the gate signal transmission film 400.

The data wires 60, 61, 62, 63 and the gate control signal wires 201, 202, 203 could be formed in a single layer type or a multi-layer type by conductive materials such as one of copper family, one of silver family, one of chromium family, or one of molybdenum family comprising nitride chromium and nitride molybdenum.

Ohmic contact layers 51, 52 consisting of impurity-doped amorphous silicon are formed between the semiconductor layer 40 and the source electrode 62 and the semiconductor 40 and the drain electrode 63, respectively.

And, a passivation layer 70 consisting of silicon nitride or silicon oxide are formed on the resultant substrate comprising the data wire 60, 61, 62 and 63, the gate control signal wire 201, 202 and 203 and the semiconductor layer 40.

A contact hole 71 exposing the drain electrode 63, a contact hole 73 exposing the data pad 61 and contact holes C1, C2 and C3 exposing the pads of the gate control signal wires 201, 202 and 203, respectively are formed in the passivation layer 70.

And, a pixel electrode 80 connected to the drain electrode 61 through the contact hole 71 and located in the pixel region, a gate auxiliary pad 81 connected to the gate pad 21 through the contact hole 72, a data auxiliary pad 82 connected to the data pad 61 through the contact hole 73 are formed on the passivation layer 80.

And also, auxiliary pads 83, 85 and 87 connected to the pads of the gate control signal wires 201, 202 and 203 through C1, C2 and C3 are formed on the passivation layer 70.

A gate signal transmission film 400 with a gate driving integrated circuit (not shown) and a data signal transmission film 300 with a data driving integrated circuit (not shown) are attached to the above described thin film transistor substrate 200 using an anisotropic conducting film 250.

Data signal lead 350 for transmitting the data signal and gate control signal leads 301, 302 and 303 for transmitting the gate control signals for driving the gate driving integrated circuit are formed in the data signal transmission film 300.

The data signal lead 350 is connected to the data pad 82 on the insulating substrate 10 to transmit the data signal into the data pad 82 connected to the data line 20. And, the gate control signal leads 301, 302 and 303 are electrically connected to the pads of the gate control signal wires 201, 202 and 203 located at the upper part of the insulating substrate 10 and transmit the gate control signals into the gate control signal wires 201, 202 and 203.

In the data signal transmission film 300, high voltage dummy leads 310 and 320 are formed to be located spatially between the high voltage signal wire 201 and the low voltage signal wire 202 or, the other signal wire 203.

The leads 301, 302, 303, 310 and 320 of the data signal transmission film 300 is formed thick by printing and patterning a copper wire of several to several tens microns on a high molecular film for the data signal transmission film. The leads 301, 302, 303, 310 and 320 of the data signal transmission film 300 is far thicker than the wires 201, 202 and 203 of the thin film transistor substrate 200. While the data signal transmission film 300 and the thin film transistor substrate 200 are attached to each other using the anisotropic conducting film 250 through an heat and compression process, the portion of the adhesive resin 252 where the high voltage dummy leads 310 and 320 exist is pushed by the thick leads 310 and 320, thereby to be compressed. Herein, the adhesive resin 252 becomes so dense that the anions 500 cannot move freely in the electrolyte. Accordingly, the high voltage dummy leads 310 and 320 function as walls to prevent the anions around the it from moving.

And, the same voltage as the high voltage signal wire 201 is applied to the high voltage dummy lead 301 in order to form an equipotential around the high voltage signal wire 201.

In the gate signal transmission film 400, gate signal lead 450 and gate control signal leads 401, 402 and 403 are formed. The gate control signal leads 401, 402 and 403 receive the gate control signals from the gate control signal wires 201, 202 and 203 and send them to the gate driving integrated circuit (not shown). The gate signal lead 450 transmits the gate signal to the gate line 20.

The gate control signal leads 401, 402 and 403 are connected to the pads of the gate control signal wires 201, 202 and 203 at the left portion of the substrate 10 and receive the gate control signals via the gate control signal wires 201, 202 and 203. The gate control signal transmitted via the gate control signal leads 401, 402 and 403 of the gate signal transmission film 400 are inputted to the gate driving integrated circuit (not shown) and control the driving of the gate driving integrated circuit.

The gate control signal lead 450 is connected electrically to the gate pad 82 formed on the insulating substrate 10 and transmits the gate signal outputted from the gate driving integrated circuit to the gate line 20 connected to the gate pad 81.

In the gate signal transmission film 400, high voltage dummy leads 410 and 420 equal to the high voltage dummy leads 310 and 320 of the data signal transmission film 300.

The constitution and operation of the control signal part where the gate signal transmission film 400 is attached to the thin film transistor substrate 200, are the same as the data signal transmission film 300 attached to the thin film transistor substrate 200. Therefore, they are not described in the following explanation.

When driving a liquid crystal display, the gate control signals are inputted to a gate driving integrated circuit (not shown) via signal leads 301, 302, and 303 of the data signal transmission film 300, the signal wires 201, 202 and 203 of the thin film transistor substrate 200 and signal leads 401, 402 and 403 of a gate signal transmission film (not shown).

In this process, an equipotential is formed between the high voltage signal lead 301 (or, the high voltage signal wire 201) and the high voltage dummy leads 310 and 320. Because same voltages are applied to both the high voltage signal lead 301 (or, the high voltage signal wire 201) and the high voltage dummy leads 310 and 320. And also, because a low voltage such as the gate-off-voltage is applied to the low voltage signal lead 302 (or, the low voltage signal wire 202), a potential difference equivalent to a voltage difference between the gate-on-voltage and the gate-off-voltage is formed between the low voltage signal lead 302 (or, the low voltage signal wire 202) and the high voltage dummy leads 310 and 320.

The moisture permeates into the wires at the location where the gate and the data transmission films 300 and 400 are attached to the thin film transistor 100 and concentrates on the step difference parts of the wires. The moisture in itself has ions. Anions 500 of them move to the high voltage dummy lead 310 from the low voltage signal wire 202 using the ACF as electrolyte by the potential difference between the high voltage dummy lead 310 and the low voltage signal lead 202.

Herein, the high voltage dummy leads 310 and 320 may be melted in the electrolytes around the high voltage dummy lead 310 and 320 by an electrochemical reaction with the anions. However, the high voltage dummy leads 310 and 320 are so thick as to provide sufficient cations to the anions, thereby to be little corroded.

The anions moved to the high voltage dummy leads 310 and 320 are blocked by the high voltage dummy leads 310 and 320, thereby not to move further. In other words, the high voltage dummy lead 310 and 320 prevent the anions of the permeated moisture from moving to the high voltage signal wire 201 by staying between the high voltage signal wire 201 and the low voltage signal wire 202.

And, the anions permeated into the circumference of the high voltage signal wire 201 lost their moving direction and exist floating around the high voltage signal wire 201 due to an equipotential between the high voltage signal lead 301 (or, the high voltage signal wire 201) and the high voltage dummy leads 310 and 320.

Accordingly, the high voltage signal wire causes little electrochemical reaction with the anions and the damage caused by the anions when driving the liquid crystal display becomes minimal.

In the liquid crystal display according to the third embodiment of the present invention, wires corresponding to the high voltage dummy leads 310, 320, 410 and 420 of the gate and the data signal transmission films 300 and 400 are not formed on the thin film transistor substrate 200. However, like a liquid crystal display shown in FIG. 10 and FIG. 11 according a fourth embodiment of the present invention, the present invention could be applied to a case in which high voltage dummy wires 210 and 220 corresponding to the high voltage dummy leads 310 and 320 of the gate and the data signal transmission films 300 are formed on the thin film transistor substrate 200.

In the liquid crystal display according to the fourth embodiment of the present invention, the gate control signal wires 201, 202 and 203 are formed by conductive materials for forming the data wire 60, 61, 62 and 63 and the high voltage dummy wires 210 and 220 are formed by conductive materials for forming the pixel electrode such as ITO or IZO.

Figure 10:
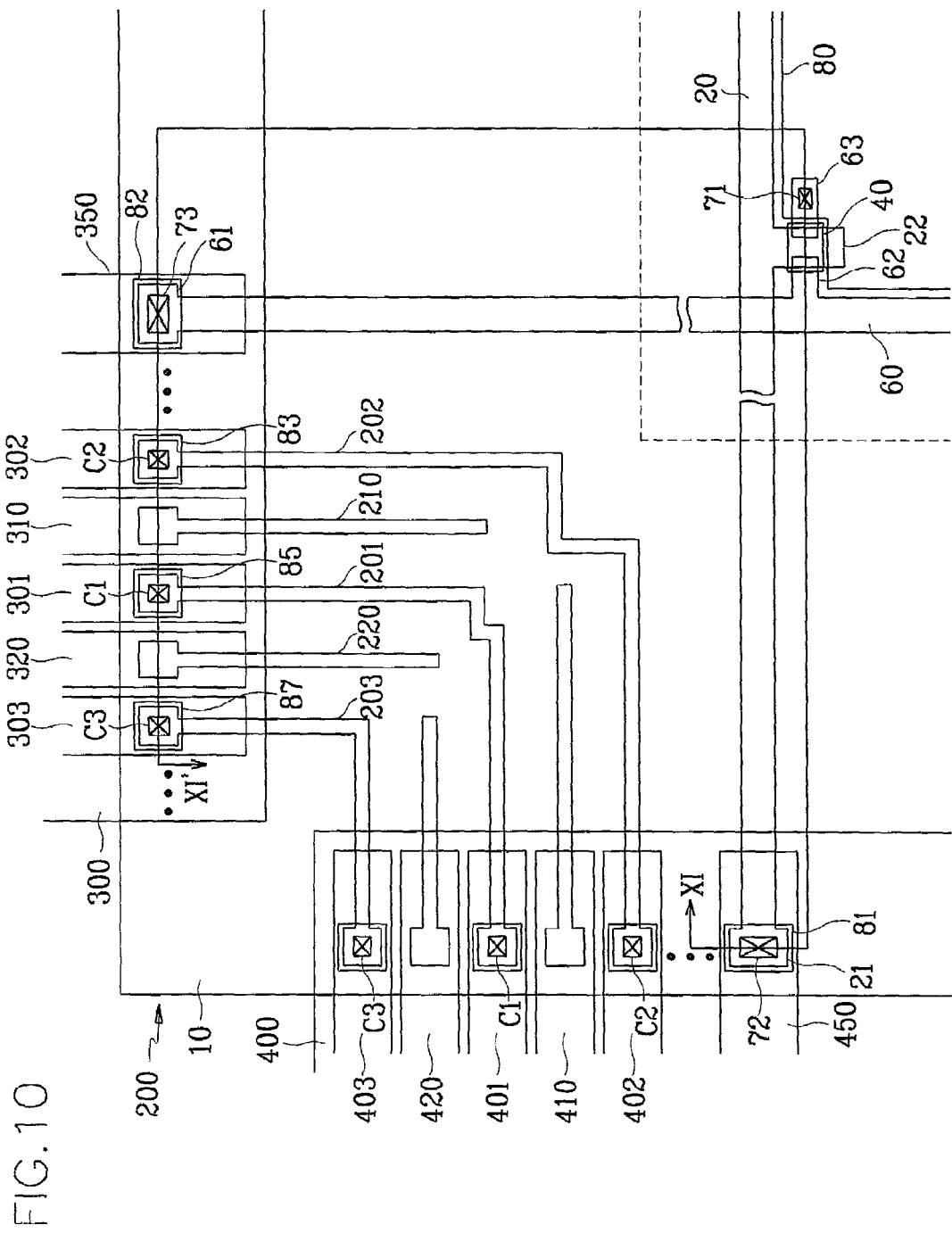
FIG. 10 is a plan view of a liquid crystal display according to a fourth embodiment of the present invention.
Figure 11:
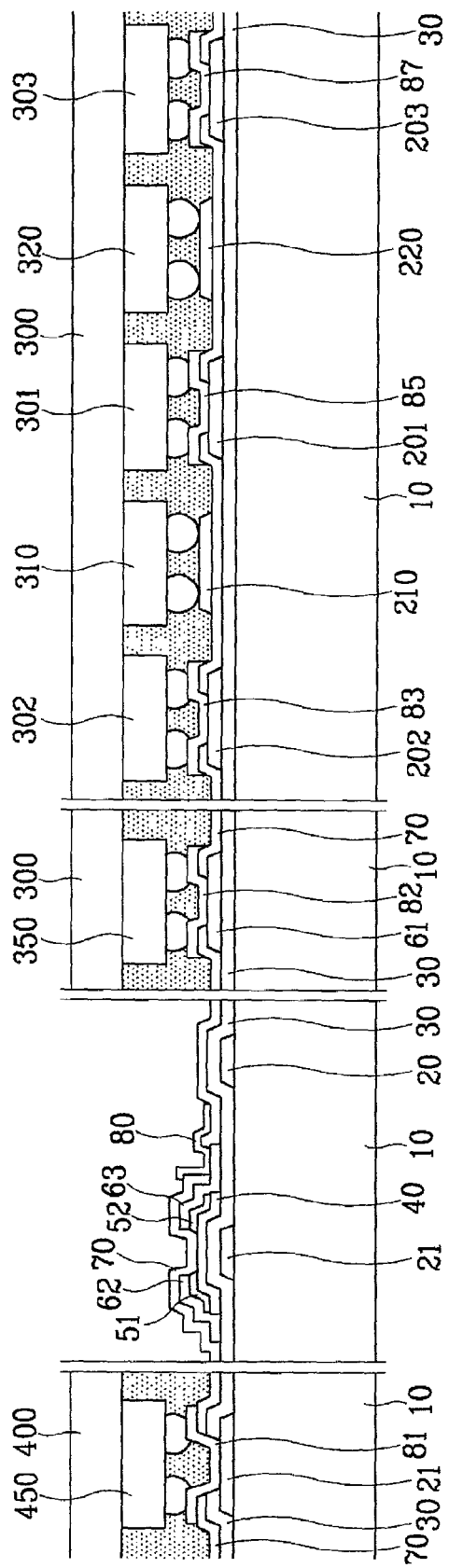
FIG. 11 is a cross sectional view of the liquid crystal display taken along the line XI–XI' of FIG. 10.

FIG. 10 is a plan view of the selected one gate control signal wire of the gate control signal wires and FIG. 11 is a cross sectional view along the line XI–XI' of FIG. 10.

When the fourth embodiment is compared with the third embodiment of the present invention, a structure of the display region is identical but a structure of the gate control signal part is different. Accordingly, the structure of the gate control signal part will be described except for the structure of the display region.

A gate insulating layer 30 is formed on an insulating layer 10 and gate control signal wires 201, 202 and 203 consisting of conductive materials for forming the data wires 20, 21, 22 and 23 are formed on the insulating substrate 10. Each of the gate control signal wires 201, 202 and 203 comprises a gate control signal line and gate control signal pads connected to both the sides of the gate control signal line.

And, a passivation layer 70 covering the gate control signal wires 201, 202 and 203 is formed on the gate insulating layer 30.

In the passivation layer 70, contact holes C1, C2 and C3 exposing the pads of the gate control signal wires 201, 202 and 203 are formed. And, the gate control signal auxiliary pads 85, 83 and 87 connected to the pads of the gate control signal wires 201, 202 and 203 are formed through the contact holes C1, C2 and C3 on the passivation layer 70.

And, on the passivation layer 70, the high voltage redundancy wires 210 and 220 are formed at both sides of the high voltage signal wire 201 transmitting the gate-on-voltage. The high voltage redundancy wires 210 and 220 are formed by conductive materials for forming the pixel electrode such as ITO or IZO.

When the high voltage redundancy wires 210 and 220 are formed by ITO or IZO, as like the fourth embodiment of the present invention, the high voltage redundancy wires 210 and 220 prevent not only the high voltage signal wire 201 but also themselves from being damaged due to the electrolysis.

When the high voltage dummy wires 210 and 220 are formed on the thin film transistor substrate, an equipotential region could be formed more widely around the high voltage signal wire 201. Herein, the high voltage dummy wires 210 and 220, as shown in figure, could be separated from the high voltage signal wire 201. On the other hand, the high voltage dummy wires 210 and 220 can be connected to the high voltage signal wire 201. When the high voltage dummy wires 210 and 220 are connected to the high voltage signal wire 201, the high voltage dummy leads 210 and 220 become redundancy wires for the high voltage signal wire 201.

The high voltage dummy wire on the thin film transistor substrate could be formed by using conventional conductive materials such as conductive materials for forming gate and data wires. Herein, the high voltage dummy wire could be formed by conductive materials less oxidative than the low voltage signal wire, such as one of copper family, one of silver family, one of chromium family, or one of molybdenum family comprising nitride chromium and nitride molybdenum. In such a case, the high voltage dummy wire could be less damaged due to the electrolysis. And, when the high voltage dummy wire is formed by oxidized conductive materials such as ITO or IZO, the high voltage dummy wire could be less reactive with the anions.

And, the high voltage redundancy wires 210 and 220 could be formed by connecting two wires. The one wire of them is located at the upper portion of the substrate 10 to be connected to the data signal transmission film 300 and the other wire of them is located at the left portion of the substrate to be connected to the gate signal transmission film 400.

The high voltage dummy leads 310 and 320 of the data signal transmission film 300 are formed to prevent the electrolysis due to the potential difference between the high voltage signal wire 201 and the low voltage signal wire 202. Accordingly, it is possible to form only one high voltage dummy wire between the high voltage signal wire 201 and the low voltage signal wire 202 when the low voltage signal wire 202 is located at only one side of the high voltage signal wire 201.

In the liquid crystal displays according to the third and the fourth embodiments of the present invention, the wire transmitting the gate-on-voltage is taken as one example of the high voltage signal wire and the wire transmitting the gate-off-voltage is taken as one example of the low voltage signal wire. However, another example of the high voltage signal wire could be a wire transmitting a power supply voltage and another example of the low voltage signal wire could be a wire transmitting a grounding voltage.

In the liquid crystal displays according to the third and the fourth embodiments of the present invention, only the gate control signal wire into which the gate control signal is inputted is described. However, the present invention is also applied to a case in which a data control signal wire into which the data control signal is inputted is formed on the thin film transistor substrate. And, the present invention could be applied to all cases proposed to prevent the melting of the wire due to the electrolysis caused by the potential difference between two wires.

In the liquid crystal displays according to the third and the fourth embodiments of the present invention, the gate control signal wires 201, 202 and 203 connected to both of the data signal transmission film 300 and the gate signal transmission film 400 is formed by conductive materials for forming the data wire. However the gate control signal wires 201, 202 and 203 could be formed by conductive materials for forming the gate wire.

In the liquid crystal display of the present invention, the overlapping structure of the leads of the signal transmission film and the wires of the thin film transistor is described as follows.

Figure 12:
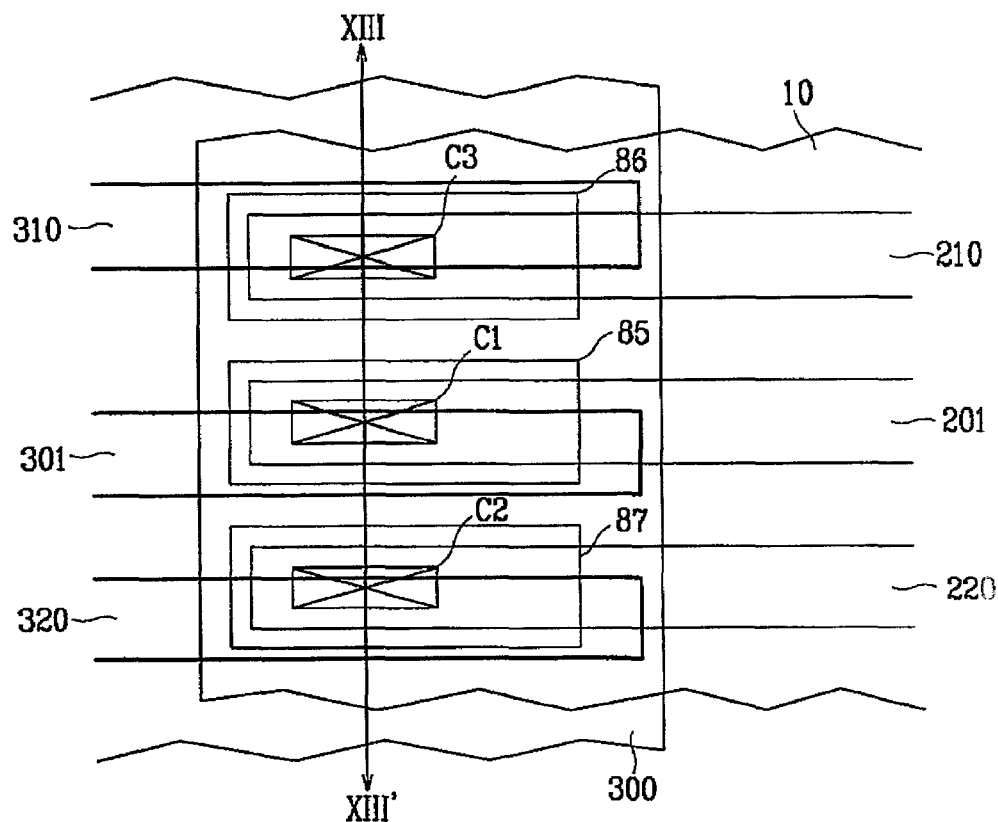
FIG. 12 is a plan view of an overlapping structure of a signal lead and a signal wire.
Figure 13:
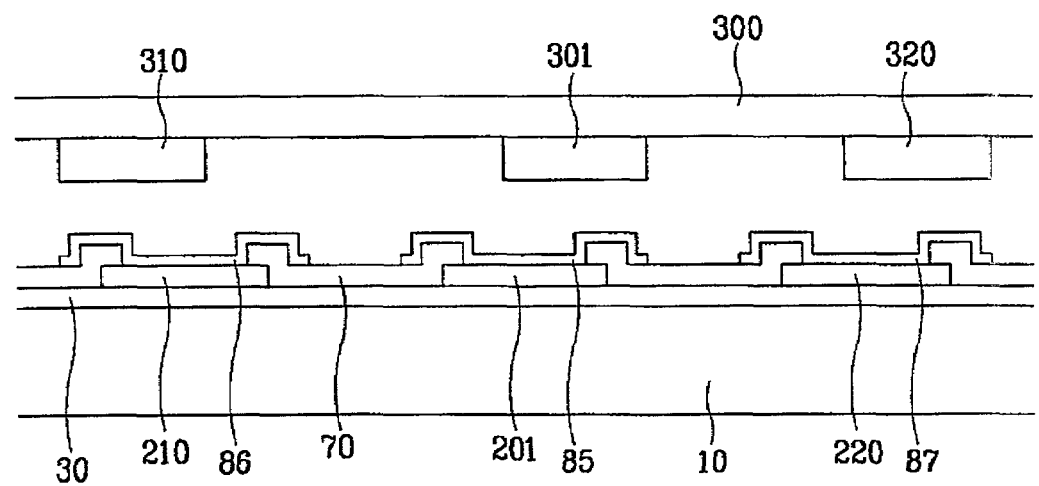
FIG. 13 is a cross sectional view of the overlapping structure taken along the line XIII–XIII' of FIG. 12.

FIG. 12 is a plan view of the overlapping of the signal lead and the signal wire and FIG. 13 is a cross sectional view along the line XIII–XIII' of FIG. 12.

In the thin film transistor substrate, a first insulating layer such as a gate insulating layer 30 is a formed on an insulating layer 10 and signal lines 201, 210, 220, a high voltage signal wire 201 and high voltage dummy wires 210 and 220, are formed on the gate insulating layer 30. And, a second insulating layer such as a passivation layer 70 is formed on the signal wires 201, 210 and 220 and contact holes C1, C2 and C3 exposing portions of the signal wires 201, 210 and 220 are formed in the passivation layer 70. And, the auxiliary pads 85, 86 and 87 connected to the pads of the signal wires 201, 210 and 220 are formed through the contact holes C1, C2 and C3 on the passivation layer 70.

When a signal transmission film 300 is attached to the above described thin film transistor substrate, the high voltage signal lead 301 is connected to the high voltage signal wire 201.

The layers covering the contact hole have step difference located at the contact hole. The auxiliary pad can not fully overlap the step difference. Therefore, the moisture permeated into the wire concentrates on the step difference and further damage the signal wire portion located at the contact hole. Accordingly, it is preferable that the high voltage signal lead 301 is formed to fully overlap the contact hole C1, especially, to fully overlap the contact hole C1 in a length direction of the contact hole C1.

However, the high voltage signal lead 301 may not fully overlap the contact hole C1 in a width direction of the contact hole. Although the high voltage signal wire 201 is not fully overlapped with the high voltage signal lead 301 and its side portions are exposed, the anions do not reach the high voltage signal wire 201 and react electrochemically with the high voltage signal wire 201 because an equipotential is formed in the circumference of the high voltage signal wire 201.

This overlapping structure of the leads and wires is not limited to only the overlapping of the high voltage signal lead and the high voltage signal wire but could be applied to the overlapping of all leads and all signal wires. FIG. 12 and FIG., 13 show that the high voltage dummy leads 310 and 320 overlap fully the contact holes C1 and C2 in a length direction of the contact hole and overlap partially the contact holes C1 and C2 in a width direction of the contact hole.

Figure 14:
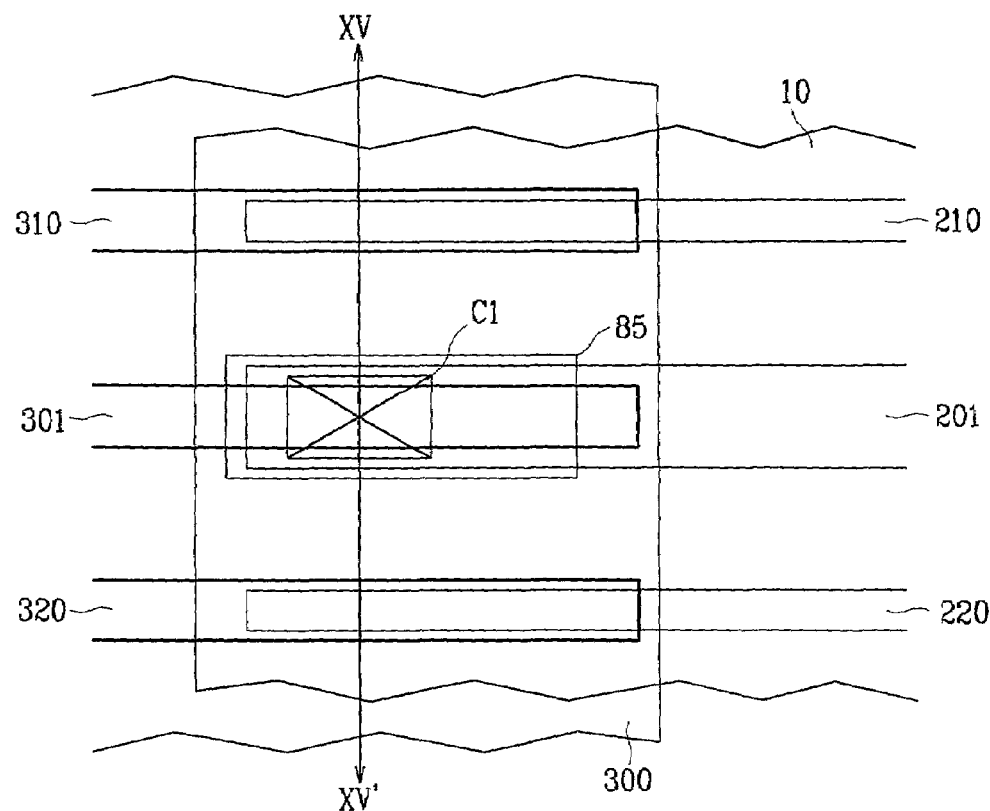
FIG. 14 is a plan view of another overlapping structure of a signal lead and a signal wire.
Figure 15:
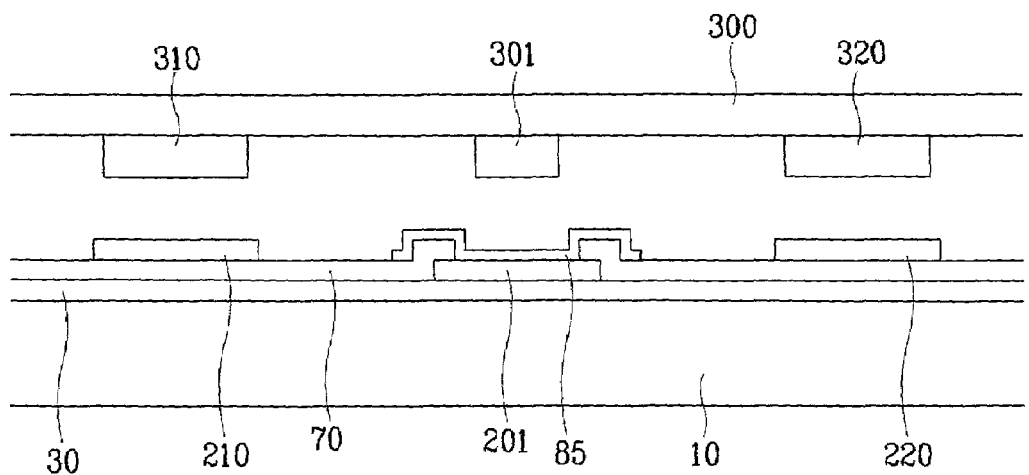
FIG. 15 is a cross sectional view of the overlapping structure taken along the line XV–XV' of FIG. 14.

FIG. 14 is another plan view of the overlapping of the signal lead and the signal wire and FIG. 15 is a cross sectional view along the line XV–XV' of FIG. 14.

In the thin film transistor substrate, a first insulating layer such as a gate insulating layer 30 is a formed on an insulating layer 10 and a high voltage signal wire 201 is formed on the gate insulating layer 30. And, a second insulating layer such as a passivation layer 70 is formed on the high voltage signal wire 201 and contact holes C1 exposing the high voltage signal wire 201 is formed in the passivation layer 70. And, the auxiliary pad 85 connected to the pad of the high voltage signal wire 201 through the contact holes C1 is formed on the passivation layer 70. And also, the high voltage dummy wires 210 and 220 are formed at both sides of the auxiliary pad 85.

When the signal transmission film 300 is attached to the above cited thin film transistor substrate 200, the lead could cover fully the contact hole exposing the signal wire in a length direction of the contact hole but cover partially the contact hole in a width direction of the contact hole.

In the drawing, the high voltage signal lead 301 is located inside region of the contact hole C1 exposing the high voltage signal lead 301 thereby to expose both sides of the high voltage signal wires 301.

The high voltage dummy wires 210 and 220 are formed by conductive materials for forming the pixel electrode, exposed fully and covered with the high voltage dummy leads 310 and 320 in a width direction.

In the liquid crystal display of the present invention, the high voltage dummy leads 310 and 320 are separated from the high voltage signal lead 301 on the data signal transmission film 300. However, the high voltage signal lead 301 could be in one body with the high voltage dummy leads 310 and 320 by making its area extend to the high voltage dummy leads 310 and 320. In such a case, the extended high voltage signal lead 301 is located spatially around the high voltage signal wire 201. Herein, although the anions move to the high voltage signal lead 301 and react with the high voltage signal lead 301, the high voltage signal leads 301 are so large and wide as to provide sufficient cations to the anions thereby to be little corroded.

In the present invention, the gate control signal wires 201, 202 and 203 could be formed by connecting two or more wires. In such a case, one wire of them could be formed by conductive materials for forming the data wire and the other wire of them could be formed by conductive materials for forming the gate wire. These wire structure could be applied to the high voltage redundancy wire. This will be explained with reference to the following drawings, FIG. 16 and FIG. 17.

Figure 16:
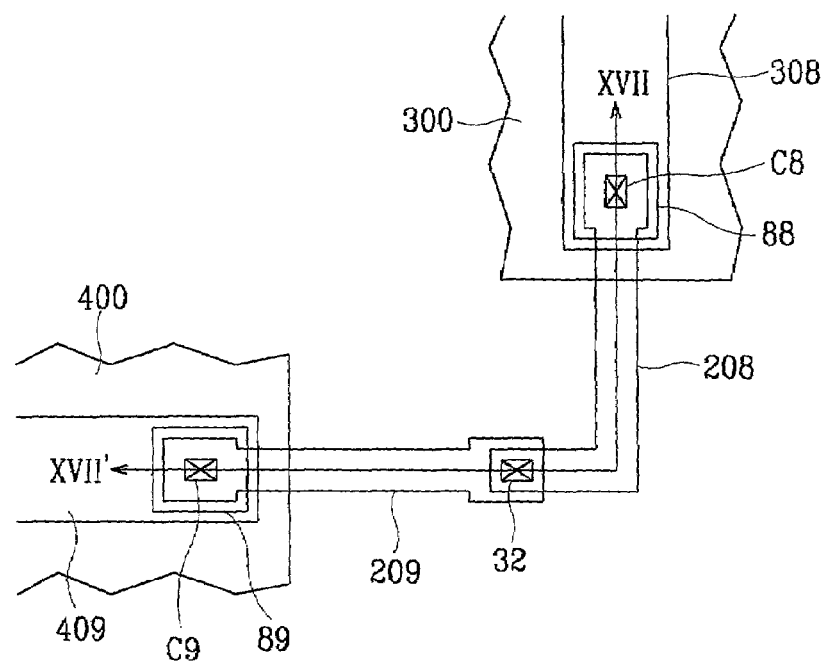
FIG. 16 is a plan view of another pattern of the signal wire of the control signal part.
Figure 17:
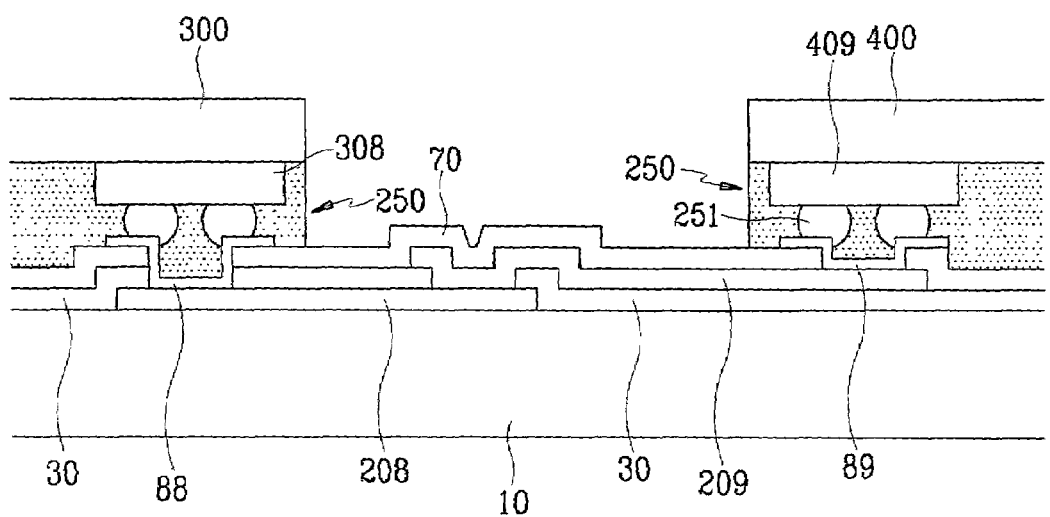
FIG. 17 is a cross sectional view of the signal wire taken along the line XVII–XVII' of FIG. 16.

FIG. 16 is a plan view of the selected one gate control signal wire of the gate control signal wires and FIG. 17 is a cross sectional view along the line XVII–XVII' of FIG. 16.

A first signal wire 208 consisting of conductive materials for forming the gate wire is formed on the insulating substrate 10 in a first direction. The pad formed at the one end of the first signal wire 208 is located at the upper portion of the substrate to be connected to the data signal transmission film 300.

A gate insulating layer 30 consisting of silicon nitride or silicon oxide is formed on the insulating substrate 10 to cover the first signal wire 208.

In the gate insulating layer 30, a contact hole 32 exposing the other end of the first signal wire 208, where the pad is not located, is formed.

And, a second signal wire 209 consisting of conductive materials for forming the data wire is formed on the gate insulating layer 30 in a second direction. The pad formed at the one end of the second signal wire 209 is located at the left portion of the substrate to be connected to the gate signal transmission film 400. The second signal wire 209 is connected to the first signal wire 208 through the contact hole 32 to transmit the gate control signal from the data signal transmission film 300 to the gate transmission film 400.

A passivation layer 70 consisting of silicon nitride or silicon oxide is formed on the 20 gate insulating layer 30. The passivation layer 70 covers the second signal wire 209.

A contact hole C9 exposing the pad of the second signal wire 209 is formed in the passivation layer 70 and another contact hole C8 exposing the pad of the first signal wire 208 is formed in the passivation layer 70 and the gate insulating layer 30.

A first signal auxiliary pad 88 connected to the pad of the first signal wire 208 through the contact hole C8 and a second signal auxiliary pad 89 connected to the pad of the second signal wire 209 through the contact hole 209 are formed on the passivation layer 70.

When the data signal transmission film 300 is attached to the above described control signal part of the thin film transistor substrate, the leads 308 of the data signal transmission film 300 is arranged and attached to the corresponding first signal auxiliary pad 88. The data transmission film 300 is attached to the control signal part of the thin film transistor substrate through a heat and compression process using an anisotropic conducting film 250. Herein, the leads 308 of the data signal transmission film 300 is electrically connected to the first signal auxiliary pad 88 by the conductive materials 251 of the anisotropic conducting film 250. And in same manner, the leads 409 of the gate signal transmission film 400 is arranged and attached to the corresponding second signal auxiliary pad 89. The gate transmission film 400 is attached to the control signal part of the thin film transistor substrate through heat and compression process using an anisotropic conducting film 250. Herein, the leads 409 of the gate signal transmission film 400 is electrically connected to the second signal auxiliary pad 89 by the conductive materials 251 of the anisotropic conducting film 250.

In the third embodiment of the present invention, the wire structure of the connection part in which each of the leads 301, 302, 303, 310, 320, 401, 402, 403, 410 and 420 of data and the gate transmission films 300 and 400 are connected to each of the wires 201, 202, 203, 210 and 220 of the thin film transistor substrate 200 has a sluggish slop in the step difference of the wire in order to minimize the amount of the permeated moisture. This will be explained with reference to the following drawings, FIG. 18 and FIG. 19.

Figure 18:
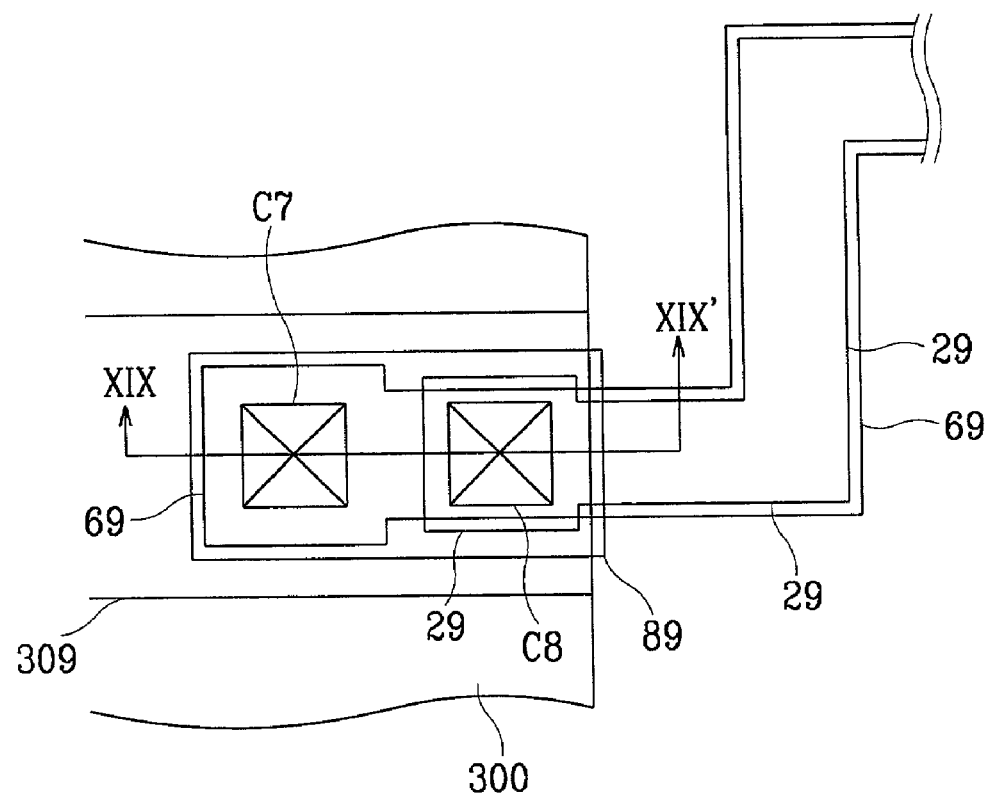
FIG. 18 is a plan view of another pattern of the pad of the signal wire.
Figure 19:
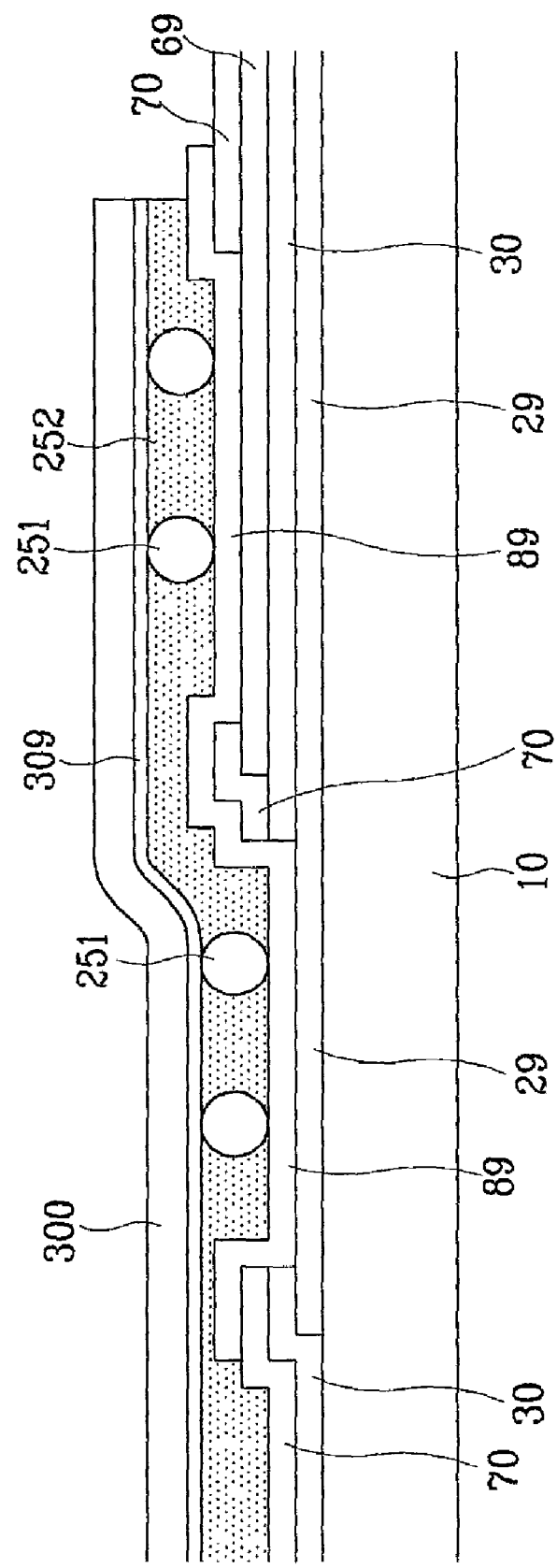
FIG. 19 is a cross sectional view of the pad taken along the line XIX–XIX' of FIG. 18.

FIG. 18 is a plan view of the wire structure of the connection part of the control signal wire and the lead. FIG. 19 is a cross sectional view along the line XIX–XIX' of FIG. 18. The lead is connected to each layer of the gate signal wire having double layers through two connection parts.

A first signal wire 29 consisting of conductive materials for forming the gate wire and having a pad at the end of itself is formed on an insulating substrate 10. And, a gate insulating layer 30 consisting of silicon nitride and covering the first signal wire 29 is formed on the insulating substrate 10 to cover the first signal wire 29.

A second signal wire 69 consisting of conductive materials for forming the data wire and having a pad at the end of itself is formed on the gate insulating substrate 30.

The second signal wire 69 is smaller than the first signal wire 29 thereby not to reach the pad of the first signal wire 29 and follows the pattern of the first signal wire 29 to overlap the first signal wire 29. And, a passivation layer 70 consisting of silicon nitride or silicon oxide is formed on the gate insulating layer 30 to cover the second signal wire 69.

A contact hole C6 exposing the pad of the second signal wire 69 is formed in the passivation layer 70 and another contact hole C7 exposing the pad of the first signal wire 29 is formed in the passivation layer 70 and the gate insulating layer 30.

A control signal auxiliary pad 89 connected to the pads of the first and the second signal wires 29 and 69 through the contact holes C6 and C7 is formed on the passivation layer 70.

When the data signal transmission film 300 is attached to the above described control signal part, the lead 309 of the data signal transmission film 300 is arranged and attached to the corresponding control signal auxiliary pad 89. The attachment of the data signal transmission film 300 and the control signal part is carried out through an heat and compression process using an anisotropic conducting film 250. Herein, the lead 309 of the data signal transmission film 300 is electrically connected to the control signal auxiliary pad 89 of the control signal part by the conductive materials 251 in the anisotropic conducting film 250. This wire structure of the connection part could decrease the amount of the bad wire connection due to the step difference of the wire and the opening of the wire and minimize the amount of the permeated moisture.

As described, in the present invention, the thick dummy lead prevents movements of the anions of moisture permeated during manufacturing or operating the liquid crystal display by forming the thick dummy lead on the control signal transmission film to be located spatially between the high voltage signal wire and the low voltage signal wire on the thin film transistor substrate. And, when the same voltage as the high voltage signal wire is applied to this thick dummy lead to form an equipotential around the high voltage signal wire, the dummy lead prevents the anions from moving to the high voltage signal wire by making the anions floating in the circumference of the high voltage signal wire. Herein, when the lead of the signal transmission film is formed to fully overlap the wire of the thin film transistor substrate, it prevents the moisture from permeating into the wire.

While the present invention has been described in detail with reference to the preferred embodiments, those skilled in the area will appreciate that various modifications and substitutions can be made thereto without departing from the sprit and scope of the present invention as set forth in the appended claims.

What is claimed is:

1. A wire contact structure, comprising:
a first substrate;
a first wire formed on the first substrate and having a first terminal;
a first insulation layer formed over the first substrate and having a contact hole exposing the first terminal;
a second substrate;
a second wire formed on the second substrate and having a second terminal electrically connected to the first terminal,
wherein the second terminal fully overlaps the contact hole in a length direction thereof and partially overlaps the contact hole in a width direction thereof.

2. The wire contact structure of claim 1, further comprising an auxiliary pad formed at the contact hole and covering the first terminal.

3. The wire contact structure of claim 2, further comprising a second insulation layer formed on the substrate, wherein the first wire is formed on the second insulation layer.

4. The wire contact structure of claim 1, wherein the first substrate is a thin film transistor (TFT) substrate of a liquid crystal display (LCD) device.

5. The wire contact structure of claim 4, wherein the first wire is a gate signal line or a data signal line of the LCD device.

6. The wire contact structure of claim 4, wherein the first wire is a dummy signal line.

7. The wire contact structure of claim 4, wherein the second substrate is a signal transmission film attached to the TFT substrate.

8. The wire contact structure of claim 7, wherein the second wire transfers a gate signal or a data signal.

9. The wire contact structure of claim 7, wherein the second wire is a dummy wire.

10. The wire contact structure of claim 1, wherein the second terminal exposes two sides of the contact hole, the two sides facing each other in the width direction thereof.

* * * * *